US012489242B2

(12) United States Patent
Dorr

(10) Patent No.: US 12,489,242 B2
(45) Date of Patent: Dec. 2, 2025

(54) ELECTRICAL CONTACT CARRIER CONNECTING MECHANISM

(71) Applicant: Amphenol-Tuchel Electronics GmbH, Heilbronn (DE)

(72) Inventor: Martin Dorr, Leingarten (DE)

(73) Assignee: AMPHENOL-TUCHEL ELECTRONICS GMBH, Heilbronn (DE)

( * ) Notice: Subject to any disclaimer, the term of this patent is extended or adjusted under 35 U.S.C. 154(b) by 327 days.

(21) Appl. No.: 18/028,449

(22) PCT Filed: Sep. 21, 2021

(86) PCT No.: PCT/EP2021/075922
§ 371 (c)(1),
(2) Date: Mar. 24, 2023

(87) PCT Pub. No.: WO2022/069294
PCT Pub. Date: Apr. 7, 2022

(65) Prior Publication Data

US 2023/0361501 A1 Nov. 9, 2023

(30) Foreign Application Priority Data

Sep. 29, 2020 (DE) ......................... 102020125345.1

(51) Int. Cl.
*H01R 13/516* (2006.01)
*H01R 13/436* (2006.01)
(Continued)

(52) U.S. Cl.
CPC ......... *H01R 13/516* (2013.01); *H01R 13/436* (2013.01); *H01R 13/506* (2013.01); *H01R 2107/00* (2013.01)

(58) Field of Classification Search
None
See application file for complete search history.

(56) References Cited

U.S. PATENT DOCUMENTS 4,191,443 A 3/1980 Doyle
6,176,745 B1 * 1/2001 Furutani .............. H01R 13/506 439/701

(Continued)

FOREIGN PATENT DOCUMENTS

CN 201699217 U 1/2011
JP H05121119 A 5/1993

(Continued)

OTHER PUBLICATIONS

International Search Report & Written Opinion for International Application No. PCT/EP2021/075922; International Filing Date: Sep. 21, 2021; Date of Mailing: Dec. 23, 2021; 4 pages.

(Continued)

*Primary Examiner* — Oscar C Jimenez
(74) *Attorney, Agent, or Firm* — CANTOR COLBURN LLP

(57) ABSTRACT

Disclosed is a contact carrier for receiving and retaining at least one plug contact, at which a line, cable can be electrically connected, the contact carrier having at least one locking device for fastening the contact carrier within a plug connector housing, the at least one locking device being formed by at least one snap hook, which, when the contact carrier is in the locked position within the plug connector housing, engages in a cut-out such that the contact carrier is fastened in the plug connector housing. The invention also relates to a method for mounting a contact carrier in a plug connector housing and to a plug connection, comprising a plug connector housing and a contact carrier received and fastened therein.

12 Claims, 7 Drawing Sheets

(51) Int. Cl.
*H01R 13/506* (2006.01)
*H01R 107/00* (2006.01)

(56) References Cited

U.S. PATENT DOCUMENTS

| | | | | |
|---|---|---|---|---|
| 6,179,657 | B1 | 1/2001 | Murakami et al. | |
| 6,695,632 | B2 | 2/2004 | Matsumoto et al. | |
| 7,695,321 | B2 * | 4/2010 | Cayzac | H01R 13/5219 439/607.41 |
| 9,954,305 | B2 * | 4/2018 | Yu | H01R 13/5219 |
| 2003/0207607 | A1 | 11/2003 | Matsumoto et al. | |
| 2015/0200484 | A1 * | 7/2015 | Randolph | H01R 24/20 439/686 |

FOREIGN PATENT DOCUMENTS

| | | | |
|---|---|---|---|
| JP | H10162888 | A | 6/1998 |
| JP | H11329564 | A | 11/1999 |
| JP | H11329571 | A | 11/1999 |
| JP | 2003323932 | A | 11/2003 |
| JP | 2006228463 | A | 8/2006 |
| TW | I703775 | B | 9/2020 |
| WO | 2016135230 | A1 | 9/2016 |

OTHER PUBLICATIONS

JP Office Action with English Translation; Appl. No 2023519214; Date Mailed: Jul. 25, 2025; pp. 1-41.

* cited by examiner

ELECTRICAL CONTACT CARRIER CONNECTING MECHANISM

CROSS REFERENCE TO RELATED APPLICATIONS

This application is a National Stage application of PCT/EP2021/075922, filed Sep. 21, 2021, which claims priority to German Patent Application Serial No. 102020125345.1, filed Sep. 29, 2020, both of which are incorporated by reference in their entirety herein.

FIELD

The disclosure relates generally to a contact carrier for receiving and securing at least one plug contact, at which a line or cable can be connected in an electrically conducting manner, having at least one locking apparatus for fixing the contact carrier within a plug-in connector housing. Furthermore, the disclosure relates generally to a method for assembling a contact carrier in a plug-in connector housing, and to a plug-in connection with a plug-in connector housing and a contact carrier which is received and fixed therein.

BACKGROUND

Contacts generally have at least one electrically conductive contact portion for releasable, temporary or plug-in connection to a corresponding counter-contact element, and a shank portion which adjoins the contact portion for fixing an electric line to the contact. A contact, plug contact or high power contact of this type can be used on a charging plug or a charging socket, for example in order to charge an electrically driven vehicle. In this case, a cable is connected firstly to a charging station and secondly carries a plug-in connector part in the form of a charging plug which can be plugged into an associated corresponding plug-in connector part in the form of a charging socket on a vehicle, in order in this way to establish an electric connection between the charging station and the vehicle. Other possible uses of high power contacts result in a multiplicity of further high power applications such as, for example, for operating a high power domestic appliance or for the energy supply of a welding unit, compressor, flow heater, etc.

Supply and charging currents can fundamentally be transmitted as DC currents or as AC currents, charging currents and high power ranges in the form of DC current having, in particular, a high current strength, for example greater than 200 A or even greater than 300 A or even 350 A, and can lead to heating of the cable and also of a high power contact which is connected to the cable.

In the case of charging operations of electric energy stores, rechargeable batteries and power supply in the high power range, heat arises as a consequence of the high electric power or electric currents transmitted, both at the cables and at the high power contacts. High power contacts and high power cables of this type which are manufactured from an electrically conductive material, for example from a copper material, heat up when the electric energy flows via the contacts, plug contacts or high power contacts; the contacts are fundamentally to be dimensioned depending on the charging current to be transmitted in such a way that the contacts have a sufficient current carrying capacity and heating at the contact elements is limited. It is the case here that a contact and the respective current carrying cable are to be dimensioned to be greater, the greater the charging current to be transmitted.

Scaling of the contact element size with an increasing charging current is subject to limits, however, on account of the associated installation space requirement, the weight and the costs. There is therefore a requirement for electric power generally and, in particular, power transmissions with great charging currents to be transmitted by way of contacts of comparatively small dimensions.

In addition to the striving for elements of small dimensions for the transmission of electric energy, the cross sections of the lines which are connected to the contact elements also have a considerable influence on the design of contacts, contact plugs and plug-in connections. In the case of high power contacts, it may be the case that the connection of the lines, feed line and the contacts or contact elements are produced by way of welding. This connecting method ensures an intimate integrally joined connection and is suitable to transmit even high power currents with a reduced resistance. This connecting method has proven to be reliable even in the case of relatively high mechanical loads.

Above all and in the case of the greater line cross section which is present in the higher power range, the considerable flexural and deformation rigidity is disadvantageous, which rigidity makes the assembly of the plug-in connection elements such as the plug-in connector housing and the plug-in modules difficult. It is likewise problematic for the assembly properties that the welding of the contact and the line has to take place before the assembly of the plug-in connection.

WO 2016/135230 A1 discloses a high voltage cable set, configured as a plug-in connection with a contact carrier in the form of a connection piece and a shield which are received in a contact collar.

DE 10 2016 105 504 A1 describes an electric plug-in connector which is optimized in terms of assembly and has a plug with a plug housing manufactured from plastic, in which at least one contact chamber is formed. The electric plug-in connector has at least one electric contact part for arranging the at least one contact chamber, the contact part having a locking pin for releasable fastening of a plug-in contact on the contact part. The contact part has a high current carrying capacity of up to 180 A at 85° C. In this context, "high voltage" can be understood to mean an electric voltage which is at least approximately 48 V, but preferably 60 V or more, further preferably 400 V up to approximately from 650 V to 1000 V.

SUMMARY

It is a desire of the disclosure to develop the construction of an at least single-pole plug-in connector plug, with the result that the assembly is improved with regard to complexity and/or positioning accuracy of the plug-in connector elements, and the disadvantages of known solutions at least partially decreased.

In order to achieve the above, the disclosure proposes a contact carrier which both secures and receives at least one plug contact, plug-in contact, plug contact pin, contact part, or contact with a line or power cable fixed thereon, and can also be fixed in a plug-in connector housing or plug housing.

The disclosure identifies that the assembly can take place in a particularly simple and reliable way by virtue of the fact that first of all a structural unit is formed, consisting of the at least one plug contact, plug-in contact, plug contact pin, contact part, or contact with the line or power cable fixed in each case thereon, and the contact carrier. Subsequently, this structural unit is introduced into the plug-in connector housing or plug housing and is fixed within the housing in a correct position via the provided locking apparatus. The locking apparatus is formed, for example, by way of one or more tongue and groove means, engagement means and/or snap-in hooks which assist a completely tool-less assembly, and increases the locking reliability by way of a design which is supported at least at two points.

By virtue of the fact that, according to the disclosure, the assembly movement is provided counter to the plug-in connection movement, the simplicity and reliability of the assembly are again increased. In practice, this means that the contact carrier with the at least one plug contact and the line optionally fastened thereto is, as it were, withdrawn and pulled into the plug housing up to fixing by way of the locking apparatus.

The assembly movement of the structural unit formed from the at least one plug contact, plug-in contact, plug contact pin, contact part, or contact with the line or power cable fixed in each case thereon, and the contact carrier counter to the plug-in connection movement can be limited in the axial direction of the plug-in connection. This takes place by way of a mechanical stop within the plug housing, which mechanical stop interacts in its position with the locking apparatus, with the result that the assembly movement is limited in such a way that the locking position is reached and assumed in a reliable and defined manner.

The correct and absolutely reliable fixing of the contact carrier with the plug contact or contacts within the plug housing relates to a further, highly important safety aspect. The disclosure realizes this aspect by way of an optical locking check. It is provided according to the disclosure for an optical accessibility of the locking apparatus to be provided, with the result that a visual check can be carried out as to whether the fixing of the contact carrier to the plug contact or contacts within the plug housing is ensured by way of the locking action.

BRIEF DESCRIPTION OF THE FIGURES

The disclosure will be explained in greater detail in the following text on the basis of one exemplary embodiment in conjunction with the figures, in which.

DETAILED DESCRIPTION

Figure 1:
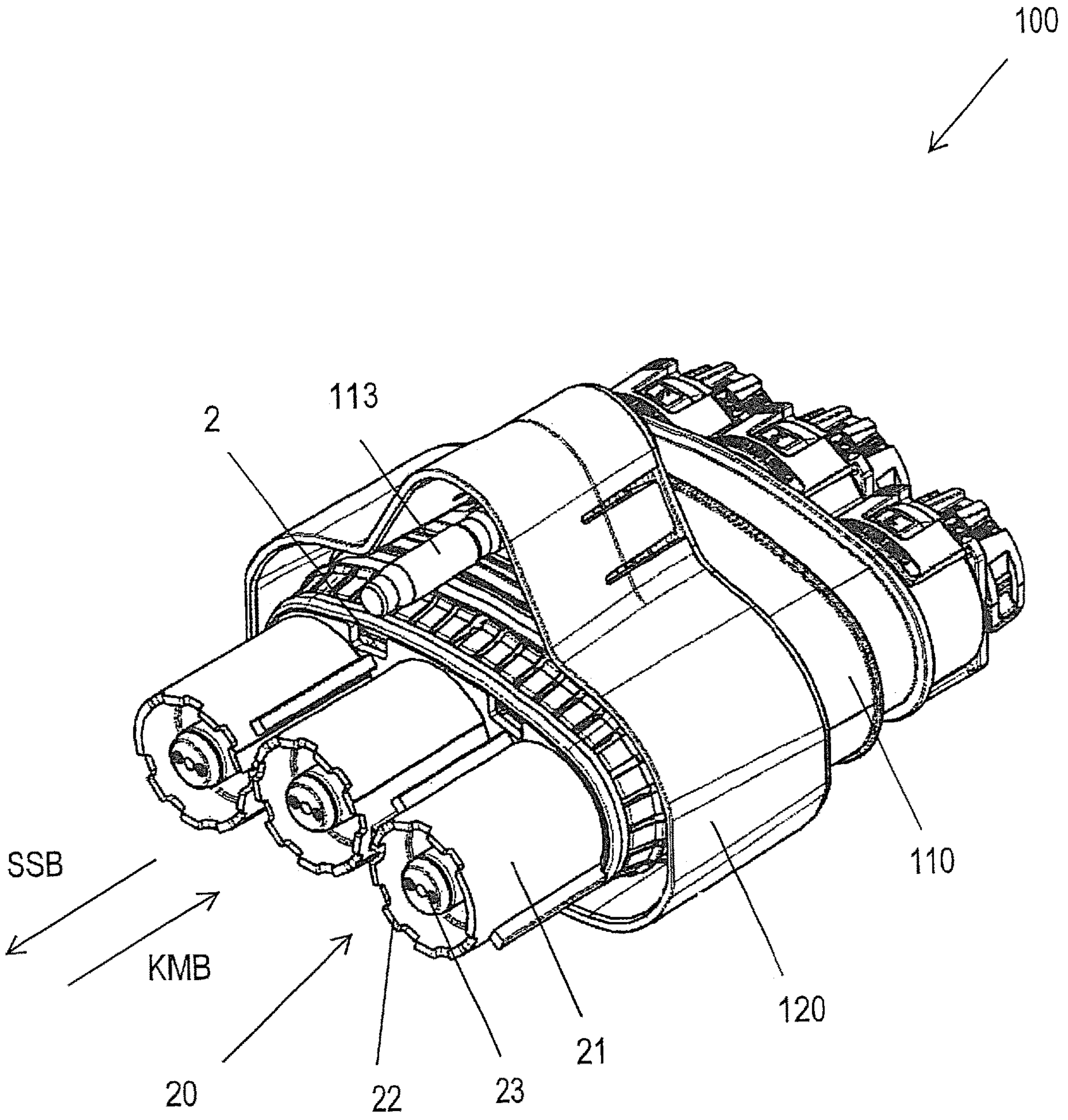
FIG. 1 shows a perspective view of a plug-in connection with a plug-in connector housing and an outer housing, and the at least one plug contact which protrudes out of the plug-in connector housing.

FIG. 1 shows the perspective view of a plug-in connection 100 with a plug-in connector housing 110 and an outer housing 120, and the at least one plug contact 20 which protrudes out of the plug-in connector housing 110. The contact carrier 1 is received in the interior of the plug-in connector housing 110 and is fixed by way of the locking apparatus 10. A check can be carried out by way of the visual, optical access 2 as to whether the locking apparatus 10 is correctly in its locking position, that is to say fulfills the securing function and positioning function reliably. In the exemplary embodiment, as shown, three plug contacts 20 and two visual, optical accesses 2 are provided. This configuration of the disclosure is exemplary; other numbers and combinations are likewise possible and are supported by the disclosure.

The plug-in connector housing or plug housing 110 can be formed from different materials with the respective specific material properties such as, for example, strength, deformation capability, insulation effect with respect to electric currents. One possible material can be a cast material. If a metallic basic material with the current-conducting properties is used, the contact carrier 1 is produced from an electric non-conducting material, for example plastic. The plug-in connector housing or plug housing 110 can be produced using the high pressure die casting or injection molding method. Particularly suitable materials in this context are aluminum, plastic, zinc-based material, magnesium and iron-based material compositions.

The at least one plug contact or plug-in contact 20 with the fastened line 30 (not shown) is secured by the contact carrier 1 in the interior of the plug-in connector housing 110, and is enclosed by a contact sleeve 21 which can optionally but not necessarily be designed with one or more crenellations 22. In order to protect a user against electric shocks, a touch guard cap 23 can be provided on the end side of the plug contact 20.

Figure 2:
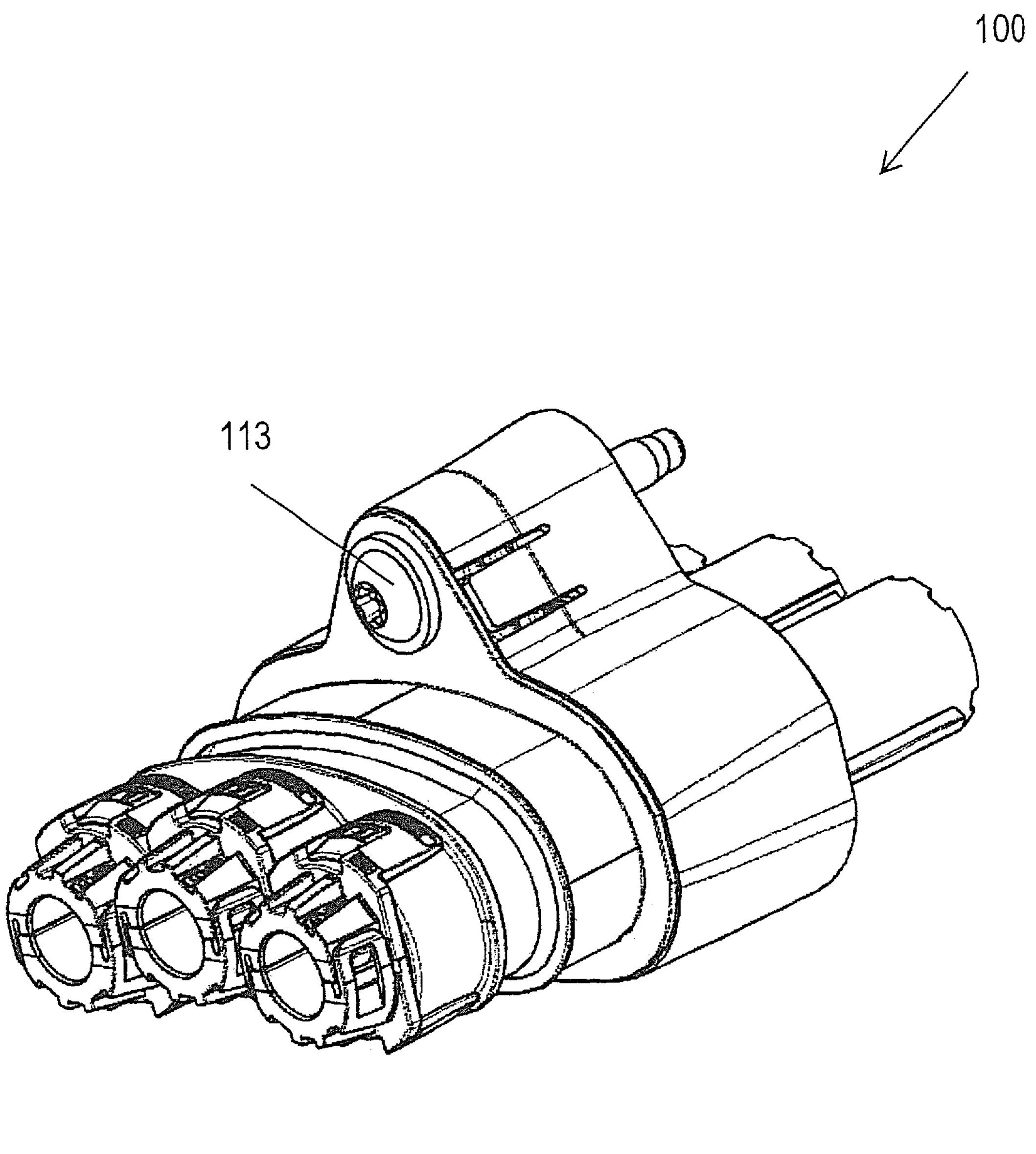
FIG. 2 shows a perspective view of a plug-in connection with a plug-in connector housing and an outer housing, and the receptacle, protruding out of the plug-in connector housing, for at least one line or power cable.

FIG. 2 comprises a perspective view of a plug-in connection 100 with a plug-in connector housing 110 and an outer housing 120, and the receptacle, protruding out of the plug-in connector housing 110, for at least one line or power cable 30. The outer housing 120 is functionally configured for local enclosure of the plug-in connector housing 110 and elements for coupling to the counter-plug. The coupling elements prevent the release of the plug-in connector housing 110, plugged to a counter-plug, by way of a secondary latch 113 (shown here by way of example by way of a screw).

Figure 3:
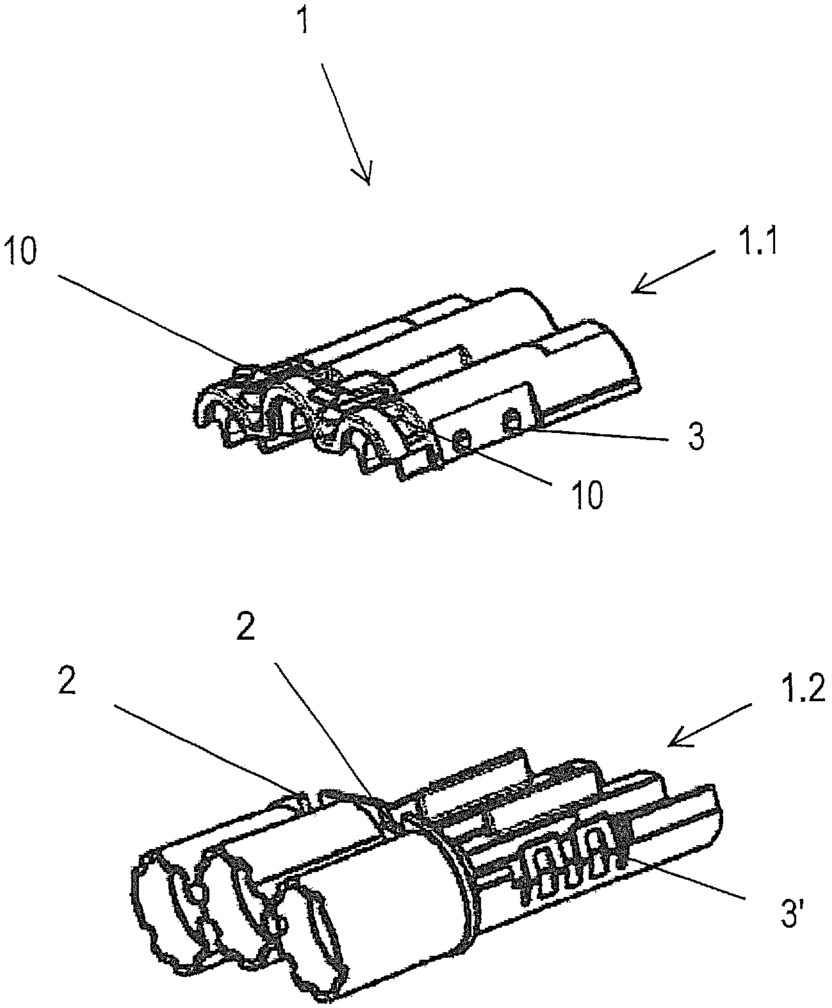
FIG. 3 shows the three-dimensional view of the contact carrier in a split form with a locking apparatus and the visual access.

FIG. 3 shows a three-dimensional view of the contact carrier 1 in a split form 1.1, 1.2 with a locking apparatus 10 and a visual access 2. For the explanation of the disclosure, the contact carrier 1 is configured as an exemplary example for receiving and securing three plug contacts 20. Numbers of plug contacts 20 which differ herefrom are also supported by the disclosure. A non-parallel position of the plug contacts 20 is possible and realized in this exemplary embodiment by virtue of the fact that the middle plug-in contact sleeve 21 which encloses the plug contact 20 is offset radially with respect to the plug-in direction in comparison with the two outer sleeves.

It is possible for the contact carrier 1 to be configured in one part or in any desired number of parts; a two-part concept is shown here. The contact carrier 1 in FIG. 3 is constructed using a first contact carrier element 1.1 and a corresponding second contact carrier element 1.2; the two elements can be fixed to one another and with respect to one another via a latch 3, 3'. The plug contacts 20 with the respective fastened lines 30 (not shown) are received and fixed in the cavities which are formed in each case between the contact carrier elements 1.1, 1.2.

The locking apparatus 10 is provided on the outer side of the first contact carrier element 1.1 and is in each case in a flush position with respect to the visual, optical access 2 when the contact carrier elements 1.1, 1.2 are combined. One of several suitable arrangements is the one selected here; a locking apparatus 10 is located in the adjoining region of two plug-in contact receiving chambers with respect to one another.

Figure 4:
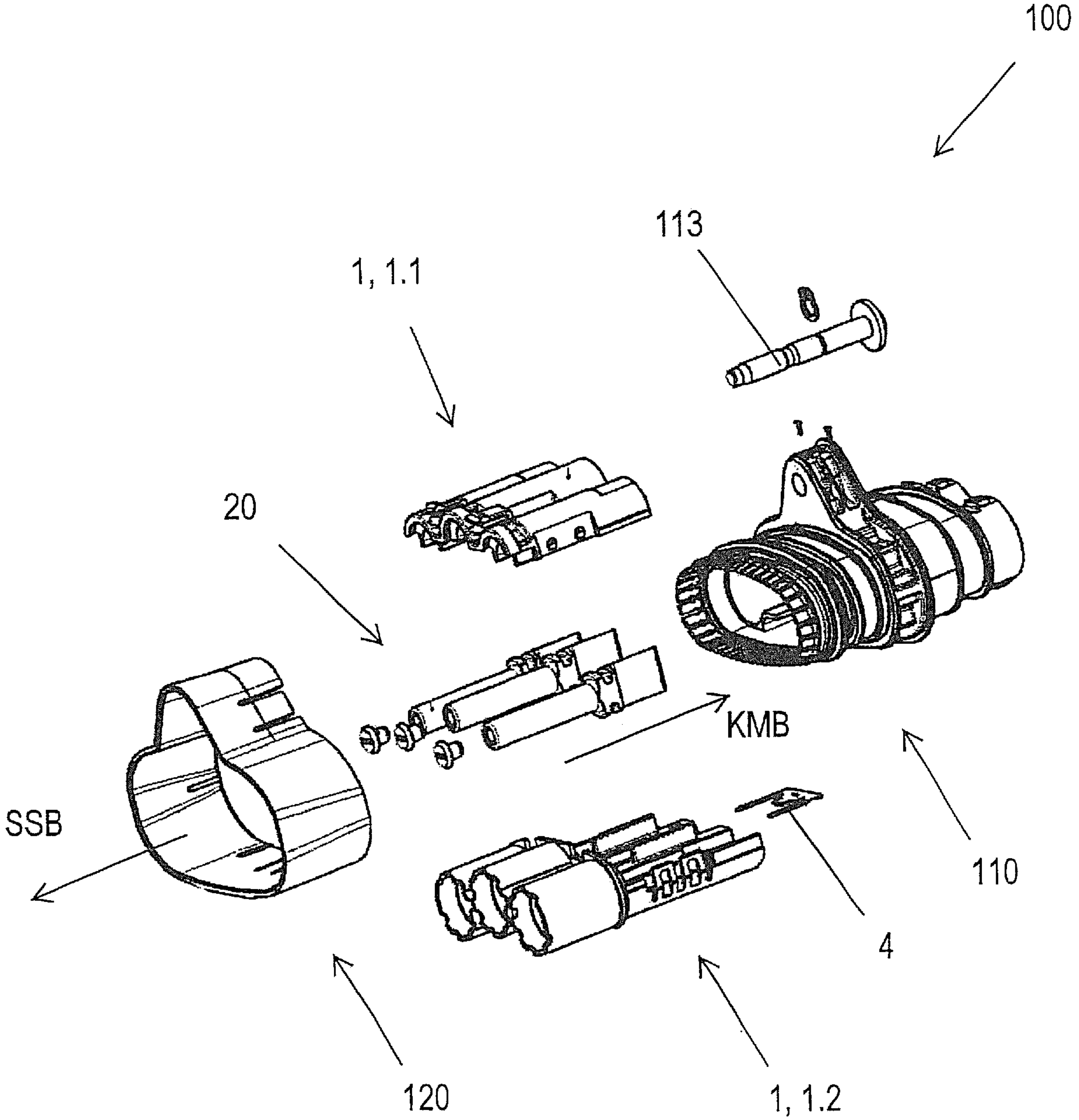
FIG. 4 shows a perspective exploded illustration of the plug-in connection with a plug-in connector housing and an outer housing, and the contact carrier in a split embodiment with the at least one plug contact.

FIG. 4 shows a perspective exploded illustration of the plug-in connection 100 with the plug-in connector housing 110 and the outer housing 120, and the contact carrier 1 in a split embodiment 1.1, 1.2 with the at least one plug contact 20. The contact carrier 1 which is in two parts here can be supplemented by way of a jumper 4.

Figure 5:
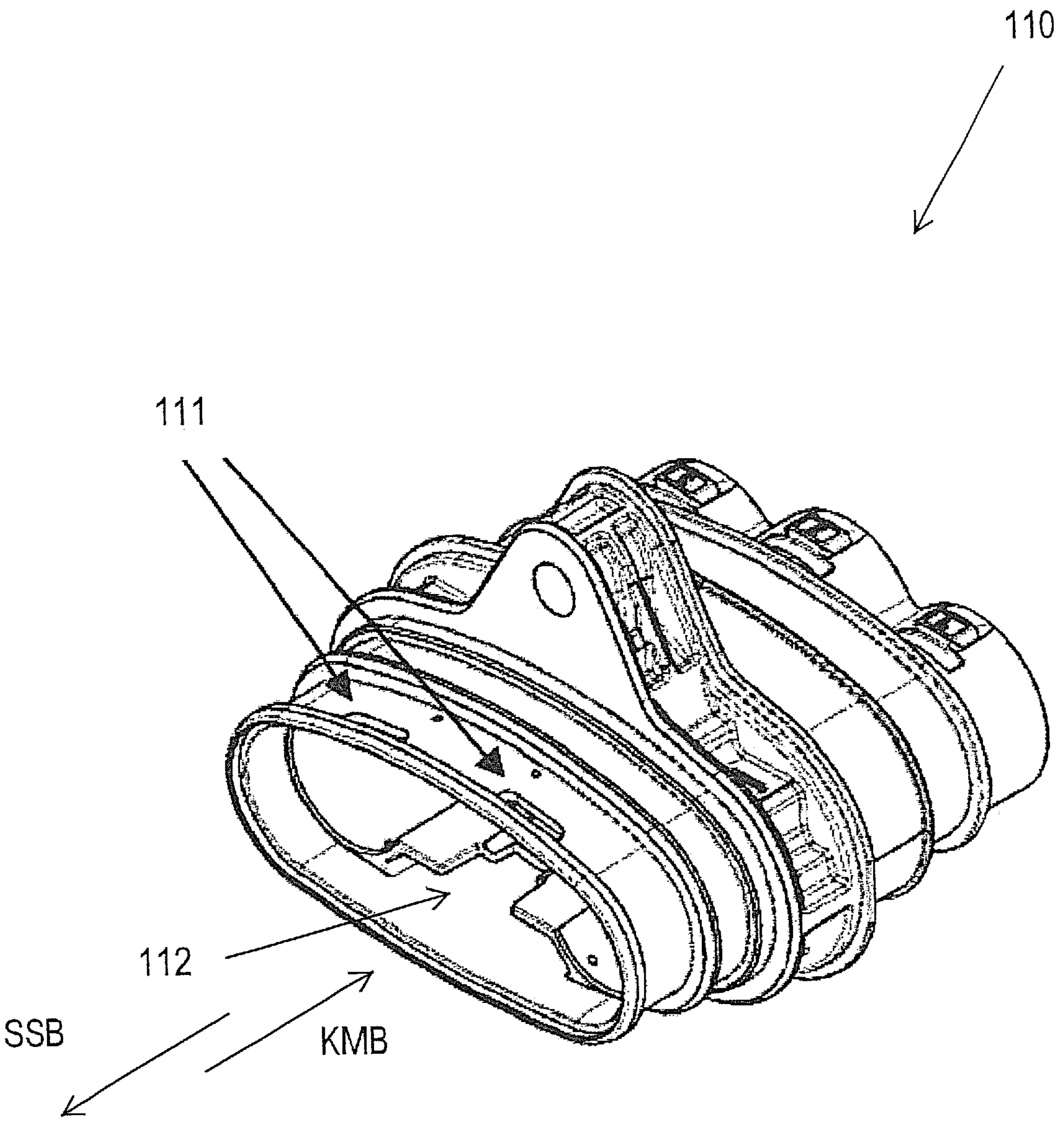
FIG. 5 shows a perspective view of a plug-in connector housing with a recess for the locking apparatus and contact carrier guide.

FIG. 5 depicts a perspective view of a plug-in connector housing 110 with a recess 111 for the locking apparatus 10 and contact carrier guide 112. The two recesses 111 which are used here by way of example are of corresponding design in terms of their position and configuration with respect to the locking apparatus 10, with the result that the fixing and securing of the contact carrier 1 takes place within the plug-in connector housing 110 in the locking position of the contact carrier 1. In the locking position, the locking apparatus 10 engages with a corresponding snap-in hook 11 into the recess 11 which is designed as a tongue and groove means, an engagement means or a snap-in hook opening, and in this way fixes the contact carrier 1 within the plug-in connector housing 110. The correct engagement of the snap-in hook 11 into the recess 111 can be checked visually according to the disclosure by way of a visual, optical access 2 which is realized as an opening in the contact carrier 1.

On the inner side, the plug-in connector housing 110 can have a guide 112 for the contact carrier 1, which guide 112 guides the contact carrier 1 during the axial movement into the locking position. The axial movement, that is to say the contact carrier assembly movement direction KMB, is directed counter to the contacting movement direction or the plug-in connector plug-in movement direction SSB. As a result of the assembly movement KMB of the contact carrier 1 which is directed counter to the plug-in connector plug-in movement direction SSB, it is possible for the assembly of the contact carrier 1 in the plug-in connector housing 110 to be brought about in a particularly secure, simple and tool-less way.

The exemplary embodiment shown of the plug-in connector housing 110 with its guide 112 and the two recesses 111, lying opposite one another diametrically at a spacing, for the snap-in hooks 11 of the locking apparatuses 10 results in a three-point support with particularly stable and reliable securing of the contact carrier 1 in the plug-in connector housing 110.

Figure 6:
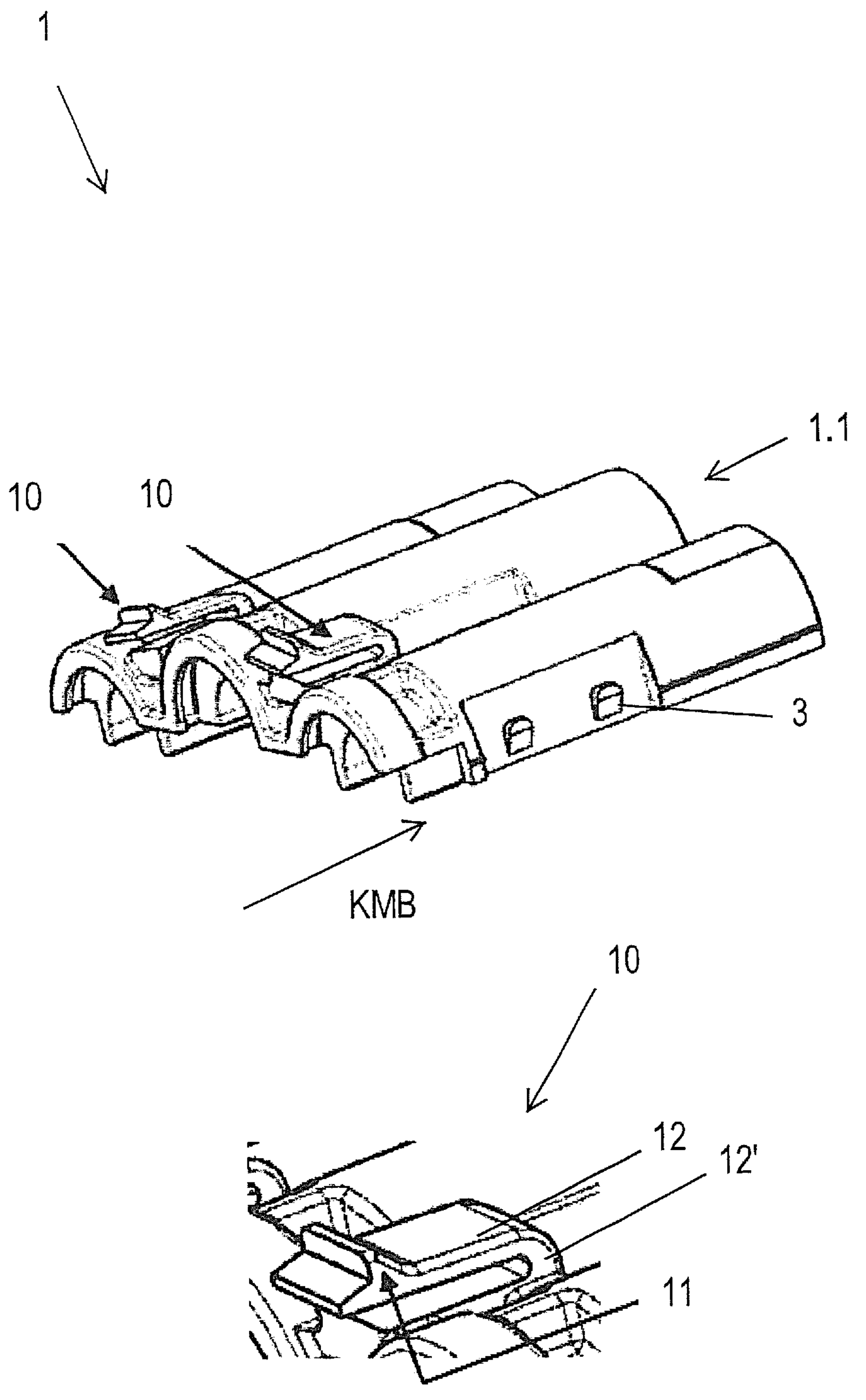
FIG. 6 shows a perspective view of the contact carrier with a locking apparatus.

FIG. 6 shows a perspective view of the contact carrier 1, 1.1 with a locking apparatus 10 in the upper illustration, and the enlarged detailed view of the locking apparatus 10 in the lower illustration.

In this exemplary embodiment, the first contact carrier element 1.1 is equipped with two locking apparatuses 10 in the form of snap-in hooks 11. The locking apparatuses 10 are arranged in each case in the region between the plug contacts 20 or flush with respect to the regions between the contact sleeves 21 of the second contact carrier element 1.2, and are spaced apart from one another. In this way, the three-point support which is highly advantageous for the stability of the securing of the contact carrier element 1.1 in the plug-in connector housing 110 can be achieved by way of a construction of the locking apparatuses 10 which is both diametrical and spaced apart for guidance purposes.

The locking apparatus 10 is constructed for the simple, tool-less assembly of the contact carrier 1 in the plug-in connector housing 110 by way of its assembly movement direction KMB counter to the plug-in connector plug-in movement direction SSB. A snap-in hook 11 is provided which is arranged on the end side of a snap-in hook arm 12. The snap-in hook contour is adapted geometrically to the corresponding recess 111 in the plug-in connector housing 110, with the result that the snap-in action is maximized reliably and the securing force against axial forces in the plug-in connector plug-in movement direction SSB acting on the contact carrier 1 is maximized. The snap-in hook arm 12 is approximately twice as long as the longitudinal extent region of the snap-in hook 11, and is coupled via a bracket 12' to the first contact carrier element 1.1. This bracket coupling is considerably advantageous for the function of the locking apparatus 10:

- as a result of the bracket 12', the snap-in hook 11 is coupled particularly elastically to the contact carrier element 1.1, with the result that the radial deflection movement of the snap-in hook 11 in the purely elastic range and without the plastic deformation components which are desired to be avoided is assisted particularly satisfactorily;
- the bracket 12' provides the snap-in hook 11 with at least the required radial minimum spacing from the outer wall of the contact carrier element 1, which radial minimum spacing has to correspond at least to the radial hook height of the snap-in hook 11; a snap-in travel of the snap-in hook 11 into the recess 111 of the plug-in connector housing 110 can only be configured in this way to be so great that the locking action takes place reliably even in the case of great forces which act axially on the contact carrier 1;
- the elasticity behavior of the locking apparatus 10 can be set in a targeted manner by way of the arcuate construction of the bracket 12' via the magnitude of the curvature radius.

As a result of the locking apparatus 10 according to the disclosure, it is possible for the assembly and locking of the contact carrier 1 to be performed in the contact carrier assembly movement direction KMB counter to the plug-in connector plug-in movement direction SSB. Furthermore, the assembly operation can take place without tools, that is to say in a tool-less manner. Here, the assembly is realized by way of force-displacement loading of the contact carrier 1 in the direction KMB into the plug-in connector housing 110.

In order for it to be possible for the particularly function-relevant check of the correct and reliable securing of the contact carrier 1 in the plug-in connector housing 110 to be brought about, at least one visual, optical access 2 is configured, via which the correct snap-in action and the proper seating of the snap-in hook 11 within the recess 111 can be checked optically.

Figure 7:
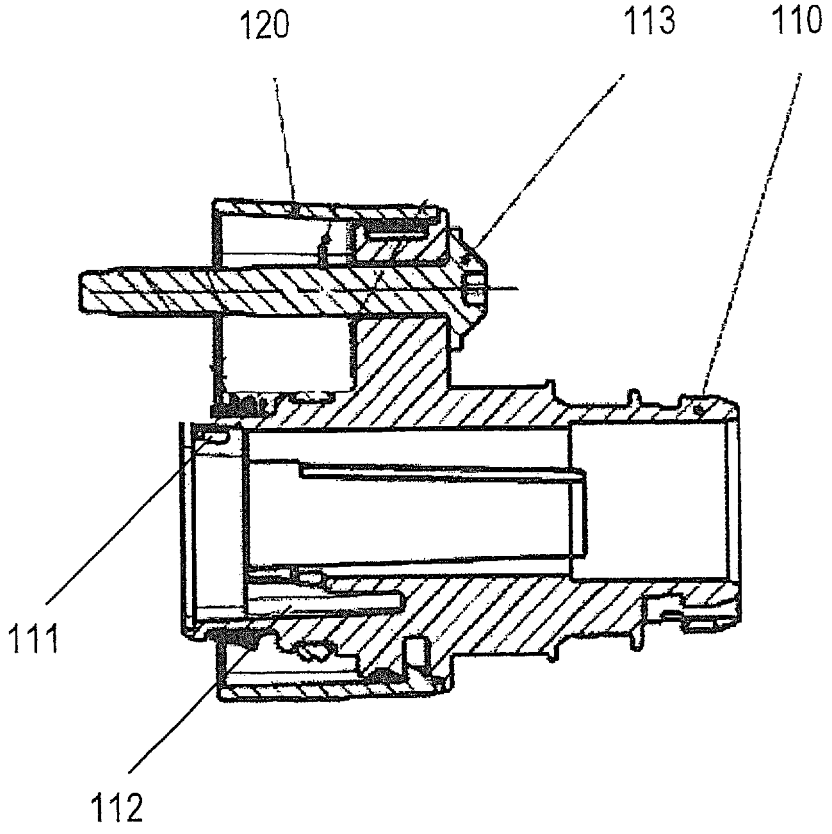
FIG. 7 shows the sectional side view of the plug-in connector housing with an outer housing.

FIG. 7 comprises the sectional side view of the plug-in connector housing 110 with the outer housing 120. In order to illustrate the diametrical situation of the recess 111 and the guide 112, the course of the sectional line through the plug-in connector housing 110 is offset.

The invention claimed is:

1. A connector with a contact carrier arranged in a connector housing of the connector, the contact carrier configured to receive and secure at least one plug contact to which a line or cable can be electrically connected, the contact carrier comprising:

at least one locking apparatus for fixing the contact carrier within a plug-in connector housing, wherein the at least one locking apparatus comprises at least one snap-in hook configured to engage into a recess of the plug-in connector housing in a locking position of the contact carrier and fix the contact carrier to the plug-in connector housing, wherein the at least one snap-in hook is arranged on an end of a snap-in hook arm comprising an arcuate extension extending from the contact carrier and having a radius of curvature, and wherein the at least one locking apparatus defines a visual, optical access arranged for visual inspection of the at least one snap-in hook, wherein the optical access is an opening defined by at least two contact elements of the contact carrier when joined together.

2. The connector as claimed in claim 1, wherein a contact carrier assembly movement direction (KMB) for assembling the contact carrier in the plug-in connector housing is opposed to a plug-in movement direction (SSB) of a plug-in connector.

3. The connector as claimed in claim 1, wherein the contact carrier is configured to receive and secure three plug contacts.

4. The connector as claimed in claim 1, wherein the contact carrier is formed by way of a first contact carrier element and at least one second contact carrier element.

5. The connector as claimed in claim 4, wherein the first contact carrier element and the at least one second contact carrier element are configured to be fixed on one another by way of a latch.

6. The connector as claimed in claim 4, wherein the visual, optical access is defined between the first contact carrier element and the at least one second contact element when joined together.

7. The connector as claimed in claim 4, wherein the locking apparatus is arranged on the first contact carrier element and configured to secure both the first contact carrier element and the at least one second contact carrier element to the plug-in connector housing.

8. The connector as claimed in claim 1, wherein the contact carrier is configured to be guided in a guide of the plug-in connector housing, the contact carrier comprising two locking apparatuses arranged opposite one another at a spacing diametrically from said guide, with the result that a three-point support is realized in the locking position.

9. A method for assembling the contact carrier as claimed in claim 1 in the plug-in connector housing, comprising the steps:

a. introducing of the contact carrier with its side which faces away from the plug contact into that opening of the plug-in connector housing which faces the plug-in direction;

b. force-displacement loading of the contact carrier in the contact carrier assembly movement direction (KMB), which is opposite to a plugging direction of the connector; and c. fixing and securing of the contact carrier by way of the locking apparatus in an end position or assembly end position.

10. The method for assembling a contact carrier as claimed in claim 9, wherein step b. and/or step c. take/takes place without the use of a tool.

11. The method for assembling a contact carrier as claimed in claim 9, wherein the locking position of the locking apparatus can be checked visually by way of the visual, optical access.

12. A plug-in connection with a plug-in connector housing and a contact carrier as claimed in claim 1 which is received and fixed therein.

* * * * *